(12) United States Patent
Fujiwara et al.

(10) Patent No.: US 8,914,252 B2
(45) Date of Patent: *Dec. 16, 2014

(54) DEVICE MANAGEMENT METHOD, ANALYSIS SYSTEM USED THEREIN, MAINTENANCE INSPECTION SUPPORT METHOD, AND MAINTENANCE INSPECTION SUPPORT APPARATUS USED THEREIN

(75) Inventors: Yoshiyasu Fujiwara, Kakogawa (JP); Kazunori Oda, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 1467 days.

This patent is subject to a terminal disclaimer.

(21) Appl. No.: 11/996,536

(22) PCT Filed: Jul. 25, 2006

(86) PCT No.: PCT/JP2006/314690
§ 371 (c)(1),
(2), (4) Date: Mar. 25, 2009

(87) PCT Pub. No.: WO2007/013466
PCT Pub. Date: Feb. 1, 2007

(65) Prior Publication Data
US 2009/0228121 A1 Sep. 10, 2009

(30) Foreign Application Priority Data

Jul. 25, 2005 (JP) .................................. 2005-214646
Jul. 26, 2005 (JP) .................................. 2005-216145
Jul. 27, 2005 (JP) .................................. 2005-217353

(51) Int. Cl.
G05B 9/02 (2006.01)
G06Q 10/00 (2012.01)
F01K 13/00 (2006.01)
F16T 1/48 (2006.01)
G07C 3/08 (2006.01)

(52) U.S. Cl.
CPC . F16T 1/48 (2013.01); G06Q 10/20 (2013.01); F01K 13/006 (2013.01); G07C 3/08 (2013.01)
USPC ......................................................... 702/118

(58) Field of Classification Search
USPC ................. 702/118–123, 176–178, 182–188; 700/81
See application file for complete search history.

(56) References Cited

U.S. PATENT DOCUMENTS 4,788,849 A 12/1988 Yonemura et al.
5,856,931 A 1/1999 McCasland
(Continued)

FOREIGN PATENT DOCUMENTS

EP 1203910 A2 5/2002
JP 62-246695 10/1987
JP 6488892 A 4/1989
(Continued)

Primary Examiner — Tung S Lau
(74) Attorney, Agent, or Firm — The Webb Law Firm

(57) ABSTRACT

A complete test involving the entire number of devices in a large group of managed devices (T) is periodically performed to determine whether the devices are operating normally or have a malfunction; a test result (Ic) is recorded in a management database (Db) for each cycle of the complete test, and a device that has been found to be malfunctioning is repaired or replaced; and the suitability of a device model is determined or a suitable device model is selected for each of the managed devices (T) on the basis of history information (N) about each of the managed devices (T) obtained from the test result (Ic) of the complete test that spans a plurality of cycles, as recorded in the management database (Db).

12 Claims, 8 Drawing Sheets

(56) References Cited

U.S. PATENT DOCUMENTS

| | | |
|---|---|---|
| 7,130,804 B2 | 10/2006 | Fujiwara |
| 2001/0006384 A1 | 7/2001 | Usaki |
| 2002/0059412 A1* | 5/2002 | Azpitarte ................ 709/223 |
| 2005/0149570 A1* | 7/2005 | Sasaki et al. ............ 707/104.1 |
| 2006/0015292 A1* | 1/2006 | Lubcke ................... 702/183 |
| 2006/0271339 A1* | 11/2006 | Fukada ................... 702/185 |

FOREIGN PATENT DOCUMENTS

| | | | |
|---|---|---|---|
| JP | 2002-140745 | 5/2002 | |
| JP | 2003-296475 | 10/2003 | |
| WO | WO 03/054481 | * 6/2003 | ............ G01F 23/284 |

* cited by examiner

DEVICE MANAGEMENT METHOD, ANALYSIS SYSTEM USED THEREIN, MAINTENANCE INSPECTION SUPPORT METHOD, AND MAINTENANCE INSPECTION SUPPORT APPARATUS USED THEREIN

TECHNICAL FIELD

The present invention relates to a technique for managing a large group of steam traps, valves, and other devices installed in a plant.

BACKGROUND ART

An example involving steam traps will now be described. To manage a large group of steam traps (referred to hereinbelow merely as "traps") installed in a plant, a method has conventionally been adopted in which, for example, managed trap Nos. 1 to 200 are selected from a group of 1000 managed traps that are assigned control numbers 1 to 1000, and each of the selected traps is tested for malfunctions in a particular year. Managed trap Nos. 201 to 400 are each tested for malfunctions in the next year, and managed trap Nos. 401 to 600 are each tested for malfunctions in the year after that. In other words, a method is adopted in which partial tests are periodically performed to test only some of the managed traps, and the plurality of managed traps subjected to the partial test is sequentially rotated.

When a malfunctioning device is detected in a group of tested traps being handled during each cycle of partial testing, the malfunctioning trap is replaced or repaired. In cases in which a comprehensive management database (e.g., a trap management log) is created so that a test result is recorded for each and every managed trap, the test result for each trap in a group of tested traps being handled during each cycle of partial testing is added to and recorded in the management database.

The present applicant has previously proposed a steam trap management method (see Patent Document 1 below) that is separate from the above-described management method. According to the proposed method, all the managed traps, i.e., both normally functioning traps and malfunctioning traps, are collectively replaced with recommended traps, a new management database is created, a complete test is then periodically performed to determine whether any trap in the entire group of managed traps (i.e., collectively replaced traps) is operating normally or has a malfunction, the test result for each of the tested traps handled during each cycle of complete testing is added to and recorded in the management database (i.e., the log is updated), and a trap that has been found to be malfunctioning is replaced or repaired.

[Patent Document 1] Japanese Laid-open Patent Publication No. 2002-140745

DISCLOSURE OF THE INVENTION

Problems That the Invention is Intended to Solve

In a facility that has a large group of managed traps, however, there is a need to improve the cost performance of the operating facility (i.e., to minimize the lifecycle cost of the facility in a comprehensive manner) by reducing a variety of costs and losses. With either of the above-described conventional management methods, however, the test results for each managed trap that are recorded in a management database can only be used as mere management records, and have so far not been used in an efficient manner to achieve an improved cost performance based on reduced costs and losses.

In addition, the first of the conventional management methods described above involves sequentially rotating the managed traps being tested during periodic partial testing. The result is that when a test result for each of a group of tested traps subjected to each cycle of partial testing is added to and recorded in a management database, mutually different test implementation conditions, such as the test period, the number of tests, and the test interval, are included at the same time in the test result for each managed trap recorded in the management database. For this reason, when an attempt is made to analyze the test results recorded in the management database and to efficiently use these test results in some form, it is difficult to perform an accurate analysis because of such differences in the test implementation conditions, and this factor also makes it difficult to efficiently use the test results recorded in a management database.

In view of the above-described situation, a principal object of the present invention is to provide a device management technique that can be used to overcome the above-described problems.

Means for Solving the Problems (1) The device management method according to the present invention is characterized in comprising: periodically performing a complete test involving the entire number of devices in a large group of managed devices to determine whether the devices are operating normally or have a malfunction; recording a test result in a management database for each cycle of the complete test, and repairing or replacing a device that has been found to be malfunctioning; and determining the suitability of a device model or selecting a suitable device model for each of the managed devices on the basis of history information about each of the managed devices obtained from the test result of the complete test that spans a plurality of cycles, as recorded in the management database.

Specifically, according to this arrangement, the suitability of a device model is determined or a suitable device model is selected based on history information about each managed device obtained from the test result of a complete test that spans a plurality of cycles, as recorded in a management database. The result is that in cases in which, for example, the malfunctioning frequency (which is an example of history information) of a specific device from among managed devices of the same model is higher than that of the other devices, as viewed from the standpoint of history information about each of the managed devices, it is possible to surmise with a high degree of probability that the problem is not with the device as such, but that the model of this particular device (heretofore adopted device model) is unsuitable for the installation conditions or service conditions of this particular device, or to otherwise appropriately determine the suitability of the model of each of the managed devices or to select a suitable device model.

In addition, a complete test is periodically performed, and the suitability of a device model is determined or a suitable device model is selected based on history information about each managed device obtained from the test result of the complete test that spans a plurality of cycles. Therefore, analysis is performed on the history information about each of the managed devices obtained from test results for which the test period, number of tests, test interval, and other test implementation conditions are the same, and the suitability of the device model is determined or a suitable device model is selected based on this analysis. The analysis can be performed accurately when carried out on history information obtained from test results having the same test implementation conditions in this manner, and the suitability of each of the managed device model can be determined or a suitable device model can be appropriately selected based on this analysis.

Specifically, based on the above, a device model suitable for the installation conditions, service conditions, or the like of each of the managed devices can be selected more appropriately than the same device model as before is merely adopted, a device model is merely selected based on the unit price of the device, or the like when replacing a malfunctioning device (and when occasionally replacing a device once a preset service period has elapsed) during each cycle of complete testing. The malfunctioning rate of managed devices can thereby be efficiently reduced; costs associated with replacing malfunctioning devices, losses (e.g., energy consumption or reduced productivity) related to the operation of a facility and caused by a malfunctioning managed device, and the like can be efficiently reduced; and losses related to the operation of a facility and caused by the fact that the model of a managed device is unsuitable for the installation conditions, service conditions, or the like can be efficiently reduced before a malfunction occurs. The lifecycle cost of the facility can thereby be efficiently minimized in a comprehensive manner, and the cost performance of the operating facility can be efficiently enhanced.

As used with reference to this arrangement, the term "periodic complete test" is not limited to a complete test performed at precise predetermined intervals, but also refers to a complete test performed, for example, approximately every six months, a complete test performed approximately every year, or to any other complete test that can be regarded as being performed on a roughly regular basis. The same applies hereinbelow.

Also, the term "history information about a managed device" does not refer to history information about a single managed device as such but, strictly speaking, refers to history information about a device provided to an installation site that accommodates a single managed device. Therefore, a case may be considered in which the number of malfunctions is used as such history information, two malfunctions occur in the managed devices on a single installation site, and the managed devices are replaced each time a malfunction occurs. In such a case, each of the malfunctioning devices experiences only one malfunction as such, but the managed devices on this installation site are considered to have two malfunctions. The same applies hereinbelow.

In this configuration, the specific contents of history information about each managed device obtained from test results recorded in a management database are not limited to the malfunctioning frequency or the number of malfunctions of each of the managed devices and may, for example, be the details of a malfunction, the cause of a malfunction, or the like at each occurrence, or any other information that can be used to determine the suitability of the model of each of the managed devices or to select a suitable device model. The same applies hereinbelow.

(2) The device management method according to another preferred aspect of the present invention is characterized in comprising: performing a complete overhaul as an initial operation to replace all the managed devices with recommended devices, and creating the management database for cumulatively recording the test result of the complete test; and periodically performing the complete test thereafter.

Specifically, a complete overhaul to replace the entire number of managed devices with recommended devices is performed in an initial operation prior to a periodic complete test. The result is that, for example, compared with a partial overhaul in which only the malfunctioning managed devices are replaced with recommended devices in the initial operation, it is possible to reduce the malfunctioning rate of the managed devices in the period following the initial operation, whereby costs associated with replacing the malfunctioning devices, losses related to the operation of a facility and caused by a malfunctioning managed device, and the like can be reduced even more efficiently in cooperation with a reduction in the malfunctioning rate such as that described above, and the cost performance of the operating facility can be enhanced even more efficiently (i.e., the lifecycle cost of the facility can be minimized in a comprehensive manner).

The complete overhaul is performed during the initial operation, and a management database for cumulatively recording the test result of a subsequent complete test is created anew. It is therefore possible to record the test result of a subsequent periodic complete test by using a management database capable of recording the test result of a complete test performed in each cycle in a recording mode suitable for obtaining history information that can be used to determine the suitability of a device model or to select a suitable device model. This makes it easier to determine the suitability of a device model or to select a suitable device model as such on the basis of the above-described history information, to proportionally reduce the management cost of the devices, and to hence enhance with even greater efficiency the cost performance of the operating facility (i.e., to minimize the lifecycle cost of the facility in a comprehensive manner).

(3) The device management method according to another preferred aspect of the present invention is characterized in comprising: performing a partial overhaul as an initial operation to repair, or to replace with recommended devices, only some of the managed devices, including all the malfunctioning devices from among the managed devices, and creating the management database for cumulatively recording a test result of the complete test; and periodically performing the complete test thereafter.

Specifically, according to this arrangement, a partial overhaul in which only some of the managed devices, including all the malfunctioning devices from among the managed devices, are repaired or replaced with recommended devices is performed during the initial operation that precedes a periodic complete test. The expense associated with the initial operation can be reduced and the request to perform the initial operation by the management requester (i.e., the request to manage devices, including performing a periodic complete test) can be facilitated in comparison with, for example, performing a complete overhaul in which the entire number of managed devices is replaced with recommended devices during the initial operation.

The partial overhaul is performed during the initial operation, and a management database for cumulatively recording the test result of a subsequent complete test is created anew. It is therefore possible to record the test result of a subsequent periodic complete test by using a management database capable of recording the test result of a complete test performed in each cycle in a recording mode suitable for obtaining history information that can be used to determine the suitability of a device model or to select a suitable device model. This makes it easier to determine the suitability of a device model or to select a suitable device model as such on the basis of the above-described history information, to proportionally reduce the management cost of the devices, and to hence enhance with even greater efficiency the cost performance of the operating facility (i.e., to minimize the lifecycle cost of the facility in a comprehensive manner).

The partial overhaul in this configuration can be performed as an overhaul in which only the malfunctioning devices among the managed devices are repaired or replaced with recommended devices, or as an overhaul in which all the malfunctioning devices and some normally functioning devices among the managed devices are repaired or replaced with recommended devices (normally functioning devices are replaced with recommended devices).

(4) The device management method according to another preferred aspect of the present invention is characterized in comprising: recovering and then bringing to a reusable state and reusing a device that has been replaced as a result of a malfunction in each cycle of the complete test or as a result of a preset service period having elapsed.

Specifically, according to this arrangement, the economic effect yielded by the above-described reuse can be used to reduce the cost of managing the devices, and the cost performance of the operating facility can be enhanced (the lifecycle cost of the facility can be minimized in a comprehensive manner) even more efficiently in proportion to the economic effect of the reuse.

In addition, such a reuse contributes to the conservation of resources, making the device management method useful from this standpoint as well.

In this arrangement, traps that have been recovered and brought to a reusable state can be reused at the facility where the traps have been recovered or at another facility.

(5) An analysis system for the device management method according to the present invention as described above is also a main subject matter of the present invention. One such analysis system is used in a device management operation comprising periodically performing a complete test involving the entire number of devices in a large group of managed devices to determine whether the devices are operating normally or have a malfunction; recording a test result in a management database for each cycle of the complete test, and repairing or replacing a device that has been found to be malfunctioning; and determining the suitability of a device model or selecting a suitable device model for each of the managed devices on the basis of history information about each of the managed devices obtained from the test result of the complete test that spans a plurality of cycles, as recorded in the management database. The analysis system is characterized in comprising: input means for inputting the test result of the complete test; storage means for cumulatively storing the test result for each cycle of the complete test that is input by the input means; and arithmetic means for creating, in accordance with a preset program, analysis data that shows history information about each of the managed devices on the basis of the test result of the complete test that spans a plurality of cycles, as stored in the storage means.

Specifically, according to this arrangement, a test result for each cycle of complete testing is input by the input means, and the storage means cumulatively stores the test result for each cycle of the complete test thus input. Therefore, the storage means stores the test result for a complete test that spans a plurality of cycles.

The arithmetic means creates, in accordance with a preset program, analysis data that shows history information about each of the managed devices on the basis of the test result of the complete test that spans a plurality of cycles, as stored in the storage means. Therefore, creating data in this manner yields analysis data about each of the managed devices obtained from test results for which the test period, number of tests, test interval, and other test implementation conditions are the same.

Therefore, the analysis data is used to determine the suitability of each managed device model or to select a suitable device model on the basis of the history information about each of the managed devices indicated in the data, allowing the suitability of the device model to be appropriately determined or the suitable device model to be appropriately selected as a way of implementing the device management method described above. Hence, the cost performance of the operating facility can thereby be efficiently enhanced (i.e., the lifecycle cost of the facility can be minimized).

Being able to automatically create such analysis data by an arithmetic means makes it possible to facilitate and streamline the entire analysis operation, including the creation of the analysis data, and hence to facilitate and streamline the entire device management operation.

In this arrangement, the analysis data that shows history information about each managed device can be written data printed on paper or the like, electronic data displayed on a computer display, or any other type of data capable of displaying history information.

The display mode for the history information in the analysis data is not limited to a display mode that shows letters or numbers, and includes display modes in which the history information is indicated using graphs, charts, drawings, symbols, colors, and the like.

(6) The analysis system according to another preferred aspect of the present invention is characterized in that the arithmetic means is configured to create the analysis data by using the malfunctioning frequency of each managed device as the history information.

Specifically, according to this arrangement, analysis data (i.e., analysis data that shows the malfunctioning frequency of each managed device) is created using the malfunctioning frequency of each managed device as the history information. The result is that in cases in which the malfunctioning frequency of a specific device from among managed devices belonging to the same model is higher than that of the other devices, as described above with reference to the device management method, it is possible to use this analysis data to surmise with a high degree of probability that this particular device model (heretofore adopted device model) is unsuitable for the installation conditions or service conditions of this particular device, or to otherwise appropriately determine the suitability of the model of each of the managed devices or to select a suitable device model.

In addition, using the malfunctioning frequency makes it easier to compare history information (malfunctioning frequency) of two managed devices than when, for example, the details of a malfunction, the cause of a malfunction, or the like is used. This makes it easier to determine the suitability of the model of each managed device or to select a suitable device model on the basis of the history information.

In this arrangement, the display mode for the malfunctioning frequency in the analysis data is not limited to a numerical display of frequency, and includes a numerical display of the number of malfunctions premised on the fact that all the managed devices are sampled at regular intervals, and other types of displays, as well as a display mode in which the frequency or number of malfunctions is visually displayed using a graph, chart, drawing, symbol, color, or the like.

(7) Another analysis system may be used in a device management operation comprising periodically performing a complete test involving the entire number of devices in a large group of managed devices to determine whether the devices are operating normally or have a malfunction; recording a test result in a management database for each cycle of the complete test, and repairing or replacing a device that has been found to be malfunctioning; and determining the suitability of a device model or selecting a suitable device model for each of the managed devices on the basis of history information about each of the managed devices obtained from the test result of the complete test that spans a plurality of cycles, as recorded in the management database. The analysis system is characterized in comprising: input means for inputting the test result of the complete test and a classification category to which each of the managed devices belongs; storage means for cumulatively storing the test result for each cycle of the complete test that is input by the input means, and storing the applicable classification category of each of the managed devices that is input by the input means; and arithmetic means for creating, in accordance with a preset program, analysis data that shows the relation between the history information about each of the managed devices and a plurality of the classification categories, or analysis data that shows the history information about each of the managed devices classified by the classification categories, on the basis of the test result of the complete test that spans a plurality of cycles and on the basis of the applicable classification category of each of the managed devices, as stored in the storage means.

Specifically, according to this arrangement, a test result for each cycle of complete testing is input by the input means, and the storage means cumulatively stores the test result for each cycle of the complete test thus input. Therefore, the storage means stores the test result for a complete test that spans a plurality of cycles, and also stores the applicable classification category of each of the managed devices that is input by the input means.

The arithmetic means creates, in accordance with a preset program, analysis data that shows the relation between the history information about each of the managed devices and a plurality of the classification categories, or analysis data that shows the history information about each of the managed devices classified by the classification categories, on the basis of the test result of the complete test that spans a plurality of cycles and on the basis of the applicable classification category of each of the managed devices, as stored in the storage means. Therefore, creating data in this manner makes it possible to obtain analysis data that shows the relation between the history information about each of the managed devices and a plurality of the classification categories, or analysis data that shows the history information about each of the managed devices classified by the classification categories, as obtained from test results for which the test period, number of tests, test interval, and other test implementation conditions are the same.

Therefore, this analysis data can be used to perform the above-described device management method in which the suitability of a device model is determined or a suitable device model is selected based on history information about each of the managed devices, and the suitability of the device model can be determined or the suitable device model selected based on the history information about each of the managed devices with reference to a relation with a plurality of classification category. It is thus possible to determine the suitability of the device model or to select the suitable device model more appropriately than when these operations are conducted based merely on history information about each managed device, and hence thereby to enhance with even greater efficiency the cost performance of the operating facility (i.e., to minimize the lifecycle cost of the facility).

Being able to automatically create such analysis data by an arithmetic means makes it possible to facilitate and streamline the entire analysis operation, including the creation of the analysis data, and hence to facilitate and streamline the entire device management operation.

In this arrangement, the analysis data that shows the relation between history information about each managed device and a plurality of classification categories, or that shows history information about each of the managed devices classified by the classification categories, can be written data printed on paper or the like, electronic data displayed on a computer display, or any other type of data capable of displaying a content.

The display mode for the relation between the history information about each managed device and a plurality of classification categories in analysis data that shows this relation is not limited to a display mode that shows the relation by using a graph, chart, or formula, and includes a display mode in which the relation is visually displayed using a drawing, symbol, color, or the like. Similarly, the display mode for the history information about each managed device classified by classification categories in the analysis data that shows this history information is not limited to a display based on a document or on numerical values, and also includes display modes that show history information by using a graph, chart, drawing, symbol, color, or the like.

(8) Another preferred aspect of the other analysis system described above is characterized in that the arithmetic means is configured to create the analysis data by using the malfunctioning frequency of each of the managed devices as the history information.

Specifically, according to this arrangement, analysis data (i.e., analysis data that shows the relation between the malfunctioning frequency of each of the managed devices and a plurality of the classification categories, or analysis data that shows the malfunctioning frequency of each of the managed devices classified by the classification categories) is created using the malfunctioning frequency of each of the managed devices as the history information. The other operating effects are the same as those described above.

(9) Another main subject matter of the present invention is a maintenance inspection support method for a maintenance inspection operation comprising periodically performing a complete test involving all the devices in a group of managed devices installed at a predetermined installation site to determine whether the devices are operating normally or have a malfunction, and repairing or replacing a device that has been found to be malfunctioning. The maintenance inspection support method according to the present invention is characterized in comprising: acquiring attribute information and a test result for each of the managed devices each time the complete test is performed; combining the acquired test result and attribute information and storing the data is a management database; creating analysis data on the basis of history information about each of the managed devices obtained from the test result that spans a plurality of cycles and is stored in the management database; and generating, based on the analysis data, support information related to determining the suitability of a device model or selecting a suitable device model for each of the installation sites provided with the managed devices.

(10) Yet another main subject matter of the present invention is a maintenance inspection support apparatus for a maintenance inspection operation comprising periodically performing a complete test involving all the devices in a group of managed devices installed at a predetermined installation site to determine whether the devices are operating normally or have a malfunction, and repairing or replacing a device that has been found to be malfunctioning. The maintenance inspection support apparatus according to the present invention is characterized in comprising: a device attribute value acquisition unit for acquiring attribute information about each of the managed devices; a device test data acquisition unit for acquiring a test result; a device evaluation data generator for combining the acquired test result and the attribute information and generating device evaluation data; a database management unit for appending a history code to the device evaluation data, storing the resulting data in a management database, and extracting device evaluation data that conforms to a search condition; a device analysis processor for creating analysis data that shows history information about each of the managed devices on the basis of the test result included in the device evaluation data that spans a plurality of cycles and is stored in the management database; and an assistance information generator for generating, based on the analysis data, support information related to determining the suitability of a device model or selecting a suitable device model for each of the installation sites provided with the managed devices.

(11) An arrangement may also be adopted in which the analysis data that shows history information about each of the managed devices is replaced with analysis data that shows the relation between the history information about each of the managed devices and the classification categories of the managed devices classified by the classification processor, or analysis data that shows the history information about each of the managed devices classified by the classification categories. A classification criteria table for storing a classification category to which each of the managed devices belongs, and a classification processor for classifying the device evaluation data by such classification categories with reference to the classification criteria table are therefore provided in the other aspect of the above-described maintenance inspection support apparatus, and the device analysis processor replaces the analysis data that shows history information about each of the managed devices, and creates analysis data that shows the relation between the history information about each of the managed devices and the classification categories of the managed devices classified by the classification processor, or analysis data that shows the history information about each of the managed devices classified by the classification categories.

KEY

T Managed device
IC Test result
Db Management database
N History information, malfunctioning frequency
2 Input means
14a, 14b Input means
17 Storage means
G, E Analysis data
Pb Preset program
16 Arithmetic means

BEST MODE FOR CARRYING OUT THE INVENTION

Figure 1:
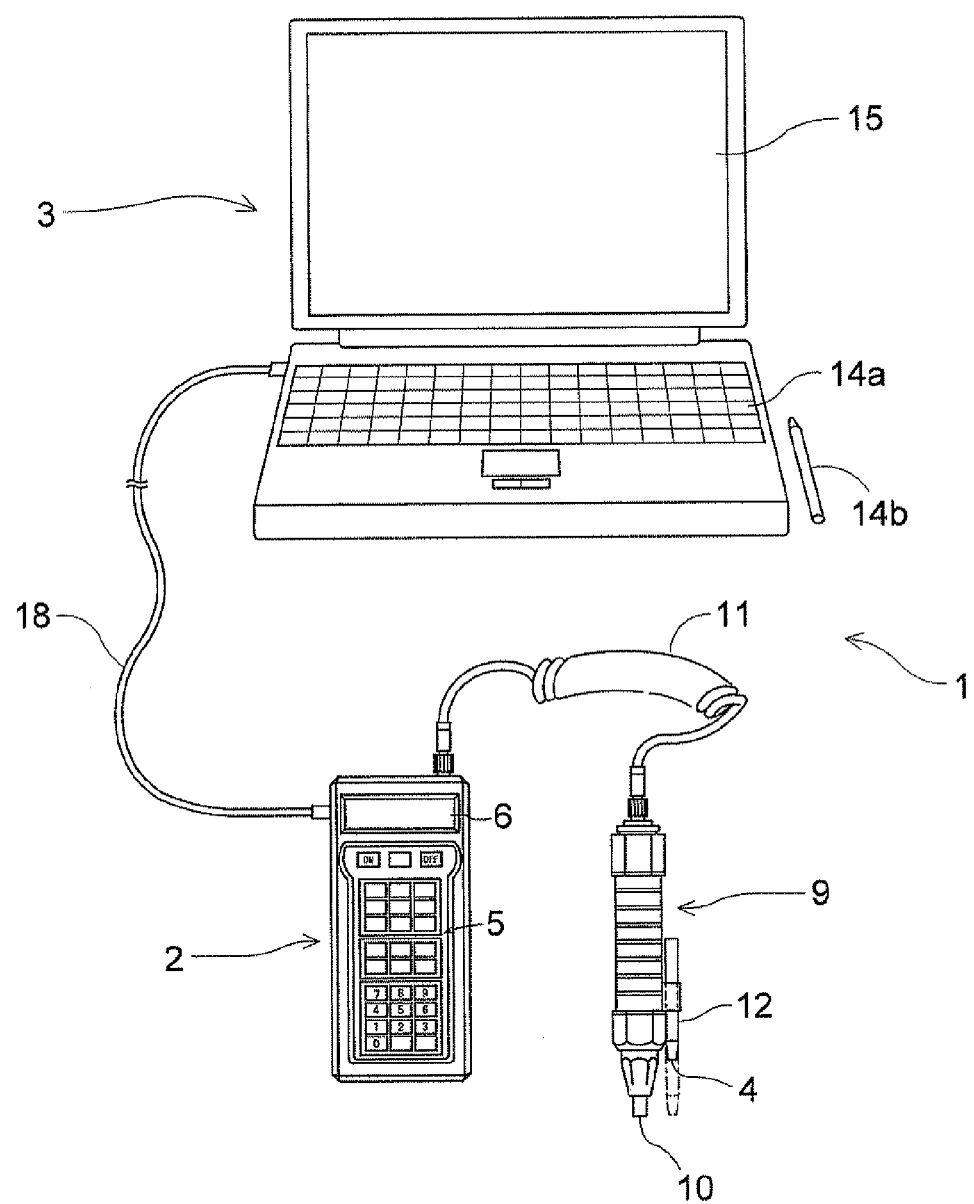
FIG. 1 is a perspective view of a management unit.
Figure 2:
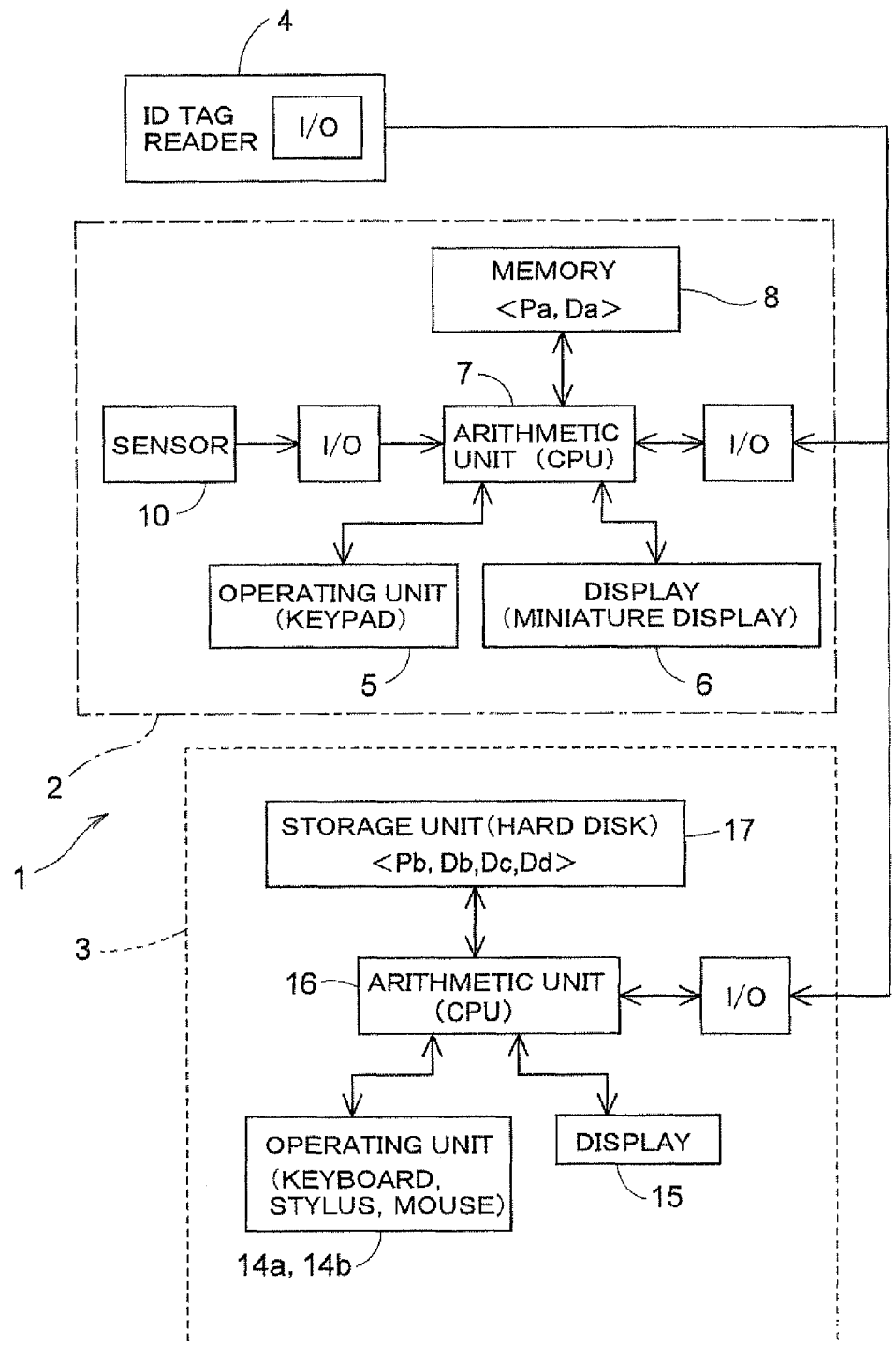
FIG. 2 is a circuit diagram of the management unit.

FIGS. 1 and 2 show a management unit 1 used in the management of a large group of vapor traps T installed in a chemical plant or other vapor-using facility. The management unit 1 is composed of a testing unit 2, a portable personal computer 3 (abbreviated as "portable PC" hereinbelow), and an ID tag reader 4.

The testing unit 2 has a keypad 5 as an operating unit, a miniature display 6 as a display unit, an internal CPU 7 (central processing unit) as an arithmetic unit, and an internal memory 8 as a storage unit. A testing program Pa is stored in the memory 8. The testing unit 2 operates in accordance with the testing program Pa executed by the CPU 7.

Figure 3:
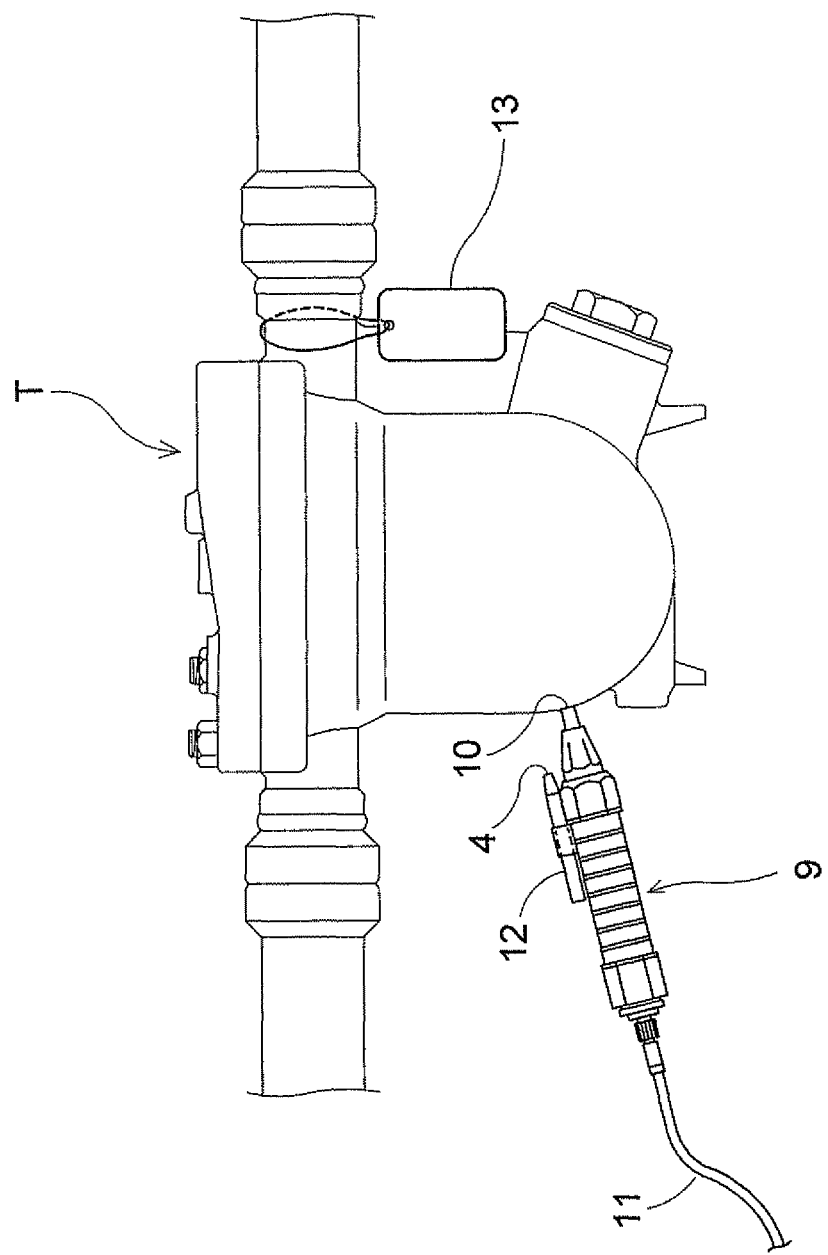
FIG. 3 is a perspective view showing a test mode.

The testing unit 2 has a probe 9. The distal end of the probe 9 is provided with a sensor 10 for detecting the supersonic vibrations and temperature at an external surface of a trap T while pressed against the external surface of the trap, as shown in FIG. 3. Vibration and temperature signals sensed by the sensor 10 are input to the testing unit 2 via a connecting cord 11 (or an infrared communication means or other wireless communication means).

The ID tag reader 4 is provided to the distal end of an arm 12 mounted on the probe 9, with the arm being able to be switched between the extended position shown by the broken line and the retracted position shown by the solid line. When the ID tag reader 4 is brought close to an ID tag 13 attached in the vicinity of each tested trap while the arm 12 is extended, the area number, trap number, and other trap identification information Ia of the corresponding trap T recorded in the ID tag 13 are read by the ID tag reader 4 and are input to the testing unit 2.

The portable PC 3 has a keyboard 14a, stylus 14b, and mouse (not shown) as operating units; a display 15 as a display unit; an internal CPU 16 as an arithmetic unit; and an internal hard disk 17 as a storage unit. A management program Pb is stored on the hard disk 17. The portable PC 3 operates in accordance with the management program Pb executed by the CPU 16.

The portable PC 3 can have two-way communication with the testing unit 2 via a connecting cord 18 (or an infrared communication means or other wireless communication means). The trap identification information Ia that is read by the ID tag reader 4 is input to the testing unit 2 and the portable PC 3.

The memory 8 of the testing unit 2 stores the model, application, service vapor pressure, and other types of trap attribute information Ib of each of the tested traps T. The testing unit 2 reads from the memory 8 the trap attribute information Ib of the tested trap T specified by the trap identification information Ia that was read by the ID tag reader 4. The trap attribute information Ib thus read and the vibrations and temperature sensed by the sensor 10 are evaluated using determination criteria information Da. The determination criteria information Da may, for example, include tables for calculating the vapor leakage rate or the like from the trap model, temperature, and vibration. The determination criteria information Da is stored in the memory 8. Obtaining the vapor leakage rate as a result of the evaluation makes it possible to determine whether the tested trap T is operating normally or has a malfunction. In addition, the malfunction category can also be determined, such as whether the leak is large, medium, or small, whether there is a blowout or an obstruction, or the like.

The testing unit 2 stores the following information in the memory 8: trap reference information Id that may include a test date, notes, and a plurality of other entries that are input by operating the keypad 5 or the like for each of the tested traps T, and the results of determining whether the traps operate normally or have a malfunction, as well as the results of determining the malfunction category as trap test results Ic (trap test information). In the process, the trap test results Ic are correlated with the trap identification information Ia and trap attribute information Ib. These types of information are also transmitted to the portable PC 3.

In the testing unit 2, the four types of information Ia, Ib, Ic, and Id about the tested traps T specified by the trap identification information Ia that was read by the ID tag reader 4 (or information about the tested traps T specified by operating the keypad 5 or in any other way) are displayed on the miniature display 6 in scrollable form.

The hard disk 17 of the portable PC 3 stores a management database Db in which the trap attribute information Ib about the tested traps T (i.e., managed traps), the trap test results Ic of each of the tests performed by the testing unit 2, the trap reference information Id, and the like are recorded in correlation with the trap identification information Ia. In the portable PC 3 that has received the trap test results Ic from the testing unit 2, a database update function is initiated, and the trap test results Ic and trap reference information Id are cumulatively recorded in the management database Db for the specified tested traps T.

The management database Db may not have any entries of the managed traps T that correspond to the trap identification information Ia read by the ID tag reader 4. When this happens, the portable PC 3 creates a record as a database creation function wherein an entry that is related to the managed traps T (i.e., unrecorded traps) and corresponds to the trap identification information Ia is newly established in the management database Db. The trap test results Ic and trap reference information Id about the managed traps T transmitted from the testing unit 2 are recorded in the management database Db at this point.

Figure 4:
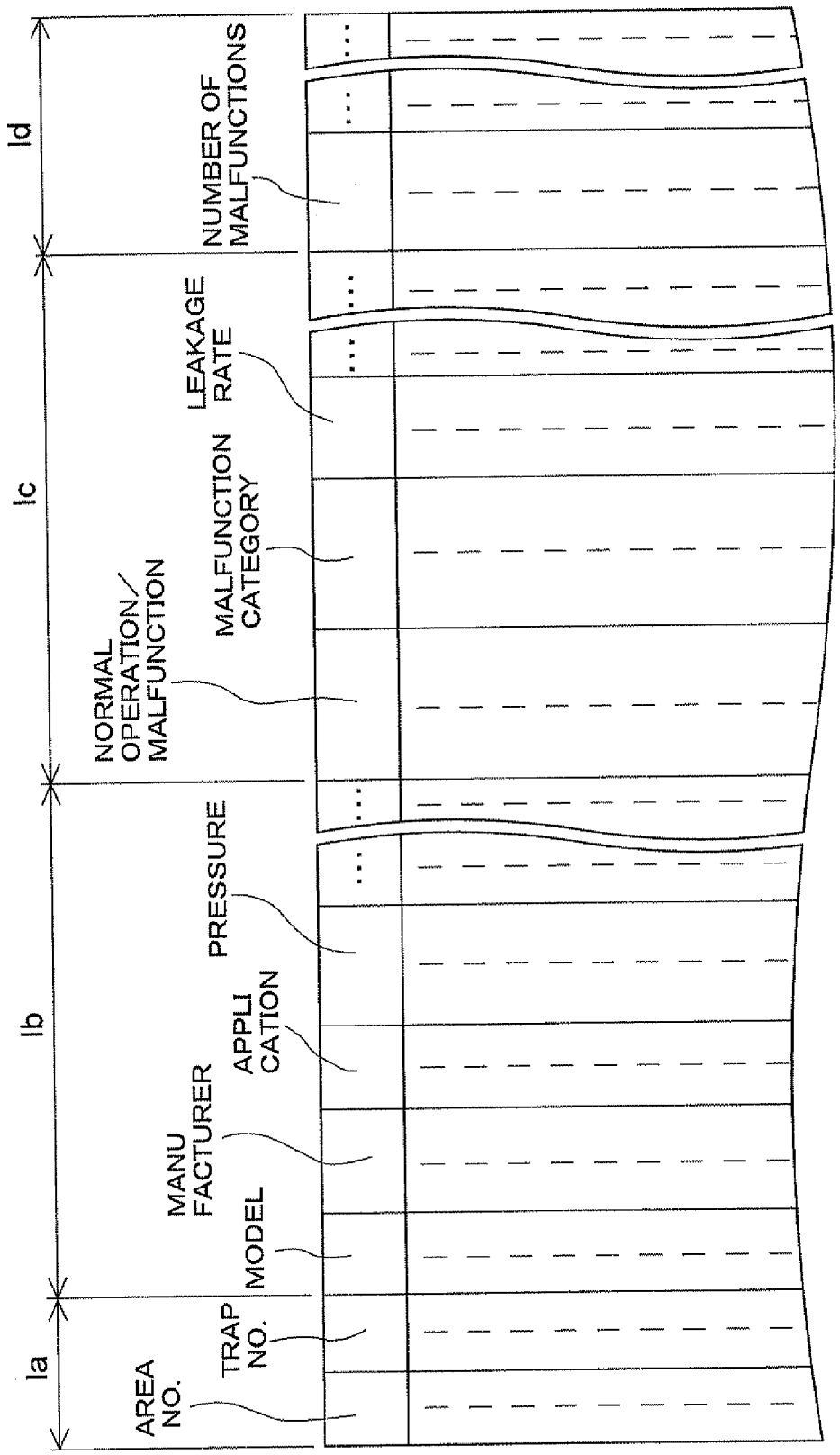
FIG. 4 is view showing the display mode of a management database.

In addition, the portable PC 3 has a database display function whereby the four types of information Ia to Id about each of the managed traps T recorded in the management database Db are displayed on the display 15 in tabular form, as shown in FIG. 4. In this database display, the table on the display 15 is scrolled so as to display entries related to tested traps T specified by the trap identification information Ia that was read by the ID tag reader 4, or to tested traps T specified by operating the keyboard 14a, stylus 14b, or the like. In cases in which the information Ia to Id about each of the managed traps T has been written or rewritten by operating the keyboard 14a or the like, the content stored in the management database Db is subjected to a write or rewrite operation accordingly.

Figure 5:
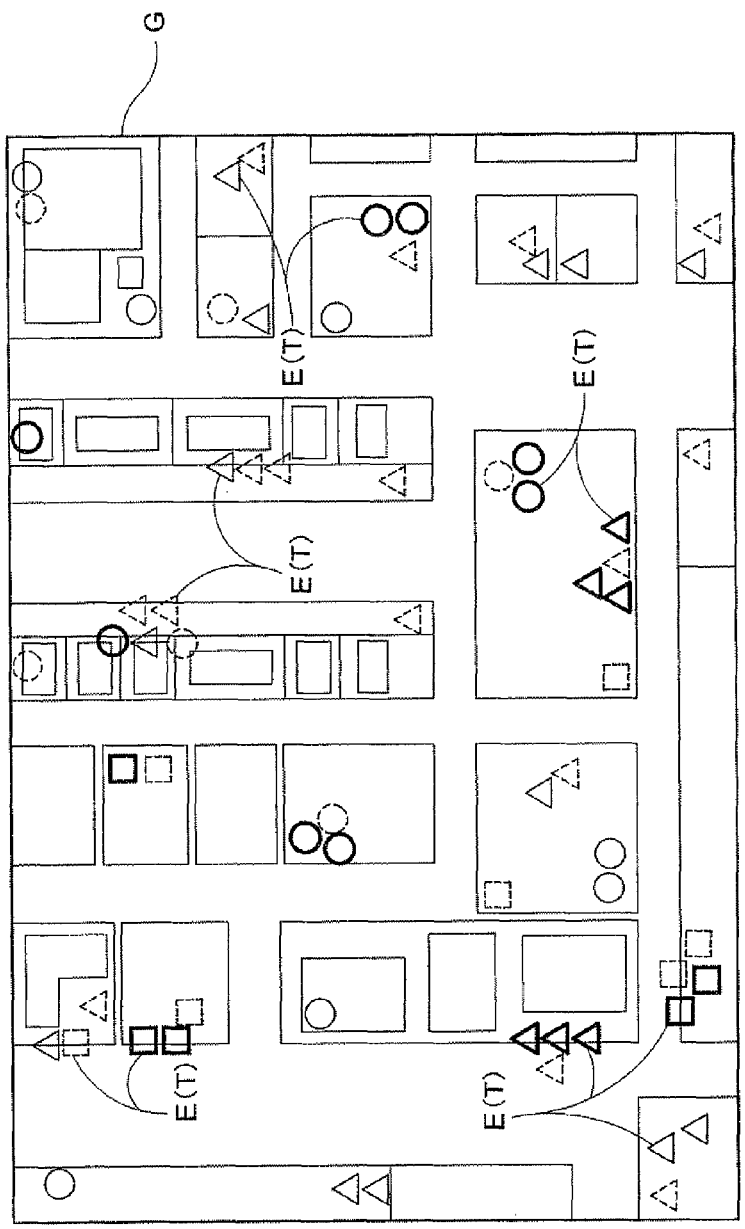
FIG. 5 is a view showing the display mode of a facility chart image.

The portable PC 3 (i.e., the management program Pb) has a mapping function and an analysis data creation function in addition to the database updating and creating function and the database display function described above. With the mapping function, a schematic facility chart image G showing the facility provided with a large group of managed traps T such as the one shown in FIG. 5 is displayed on the display 15 on the basis of facility chart information Dc stored on the hard disk 17. This display is provided instead of the above-described tabular database display shown in FIG. 4. In addition, display elements E (icons) that show individual tested traps T are overlaid on the facility chart image G and displayed on the display 15 in an arrangement that conforms to the actual trap positions. The overlaying is performed on the basis of the trap arrangement information Dd about each of the tested traps T that is stored on the hard disk 17 in the same manner.

When any of the display elements E displayed in the facility chart image G on the display 15 of the portable PC 3 is selected by operating the stylus 14b or the like and is designated for execution, the information Ia to Id about the managed trap T that corresponds to this display element E is read from the management database Db and displayed as a separate frame in the facility chart image G on the display 15.

In addition, as an analysis information creation function of the portable PC 3, the application of the corresponding trap T can be displayed using differences in the shape of the display elements E on the basis of the trap attribute information Ib of each of the managed traps T recorded in the management database Db, as shown in FIG. 5. In this case, a square indicates a general use, a triangle indicates a trace use, and a circle indicates the main pipeline use. Based on the trap test result Ic for each managed trap T cumulatively recorded in the management database Db, and depending on the differences in the border color or pattern of the display elements E, the number N of malfunctions of the corresponding trap T in the most recent preset period (e.g., 3 years) is displayed as history information about each of the managed traps T. In this example, a thin solid border indicates zero times, a thin broken border indicates a single time, and a thick solid border indicates a plurality of times.

As used herein, the term "number N of malfunctions (i.e., malfunctioning frequency) in a preset period" refers to the number of malfunctions experienced by managed traps T installed at a single installation site that accommodates the traps, rather than the number of malfunctions of a single managed trap T as such.

A single entry or a plurality of entries in any type of information Ia to Id about the managed traps T is similarly displayed as the analysis data creation function in the form of a tabular database display in the portable PC 3, as shown in FIG. 4. In this display, the classification categories (i.e., general use, trace use, main pipeline use, and other classification categories in the "application" entry) of these entries are specified as search conditions by operating the keyboard 14a, the stylus 14b, or the like, whereupon the information Ia to Id recorded in the management database Db is displayed in tabular form on the display 15 only for the managed traps T that belong to these classification categories. For example, specifying "float type" as a search condition for the model entry in the trap attribute information Ib causes the information Ia to Id recorded in the management database Db to be displayed on the display 15 only for float-type managed traps T.

Figure 6:
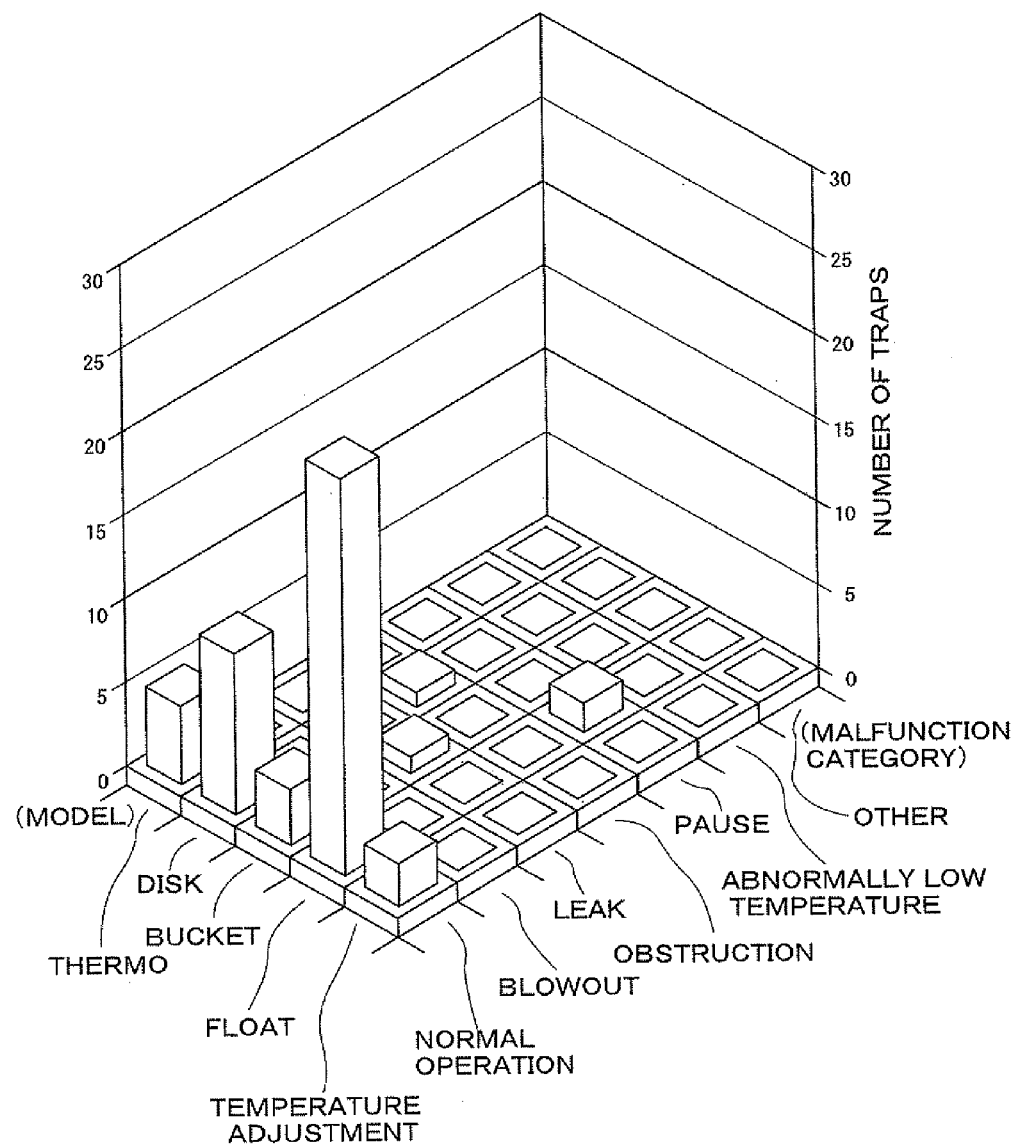
FIG. 6 is a view showing an analysis graph.
Figure 7:
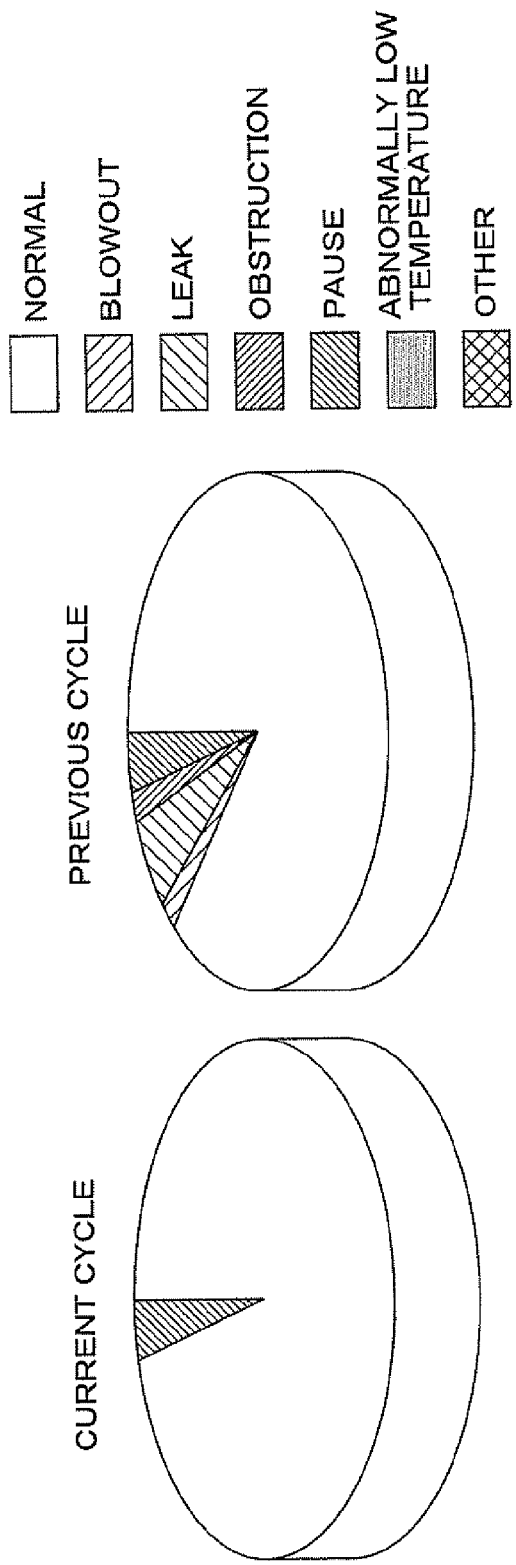
FIG. 7 is a view showing an analysis graph.

The portable PC 3 further has the following analysis data creation function. When a graphic display is specified in a state in which two entries selected from the information Ia to Id about the managed traps T are indicated by operating the keyboard 14a, stylus 14b, or the like, the number of traps belonging to the classification categories of one of the entries and the number of traps belonging to the classification categories of the other entry (i.e., the number of traps in each classification category for the second entry) are displayed on the display 15 on the basis of the information Ia to Id recorded in the management database Db. The display is in the form of a 3D bar graph, pie graph, or other specified graph. For example, a graph is displayed on the display 15, as shown in FIG. 6, by indicating a model entry in the trap attribute information Ib and indicating entries classified by the malfunction categories in the trap test result Ic for an arbitrary cycle, and specifying a graphic display based on a 3D bar graph. Also, a graph is displayed on the display 15, as shown in FIG. 7, by indicating entries classified by the malfunction categories in the trap test result Ic for a preceding cycle and indicating entries classified by the malfunction categories in the trap test result Ic for the current cycle, and specifying a graphic display based on a pie graph.

A large group of vapor traps T is managed according to the following sequence (a) to (f) using a management unit 1 configured as described above.

(a) It is determined by consultations with the trap management requester which of the vapor traps at a facility are to be designated as managed traps T. Specifically, it is determined based on discussions with the management requester whether all the vapor traps at the facility are to be designated as managed traps T, only the vapor traps in some of the sections at the facility are to be designated as managed traps T, only the vapor traps belonging to a specific vapor system in the facility are to be designated as managed traps T, or the like.

(b) Facility chart information Dc and trap arrangement information Dd, which are stored on the hard disk 17 of the portable PC 3, are created based on a facility arrangement chart, pipeline system chart, or the like presented by the management requester, and the facility chart information Dc and trap arrangement information Dd thus created are stored on the hard disk 17 of the portable PC 3.

(c) As an initial operation, the test operator brings the management unit 1 to the installation site of each of the managed traps T while consulting the facility chart image G displayed on the display 15 of the portable PC 3 and the display elements E on the facility chart image G, attaches an ID tag 13 to each of the managed traps T, and reads the trap identification information Ia by using the ID tag reader 4. Entries related to each of the managed traps T are thereby created by the database creation function in the management database Db of the hard disk 17 in the portable PC 3. In addition, the trap identification information Ia and the display elements E for each of the managed traps T are correlated by the operation of a stylus 14b or the like.

In addition to attaching ID tags 13 and reading the trap identification information Ia, the test operator also confirms the trap attribute information Ib and trap reference information Id for each of the managed traps T, and enters the trap attribute information Ib and trap reference information Id into the management database Db of the portable PC 3 by operating the keyboard 14a, stylus 14b, or the like. The management database Db is thus created anew for all the managed traps T.

Furthermore, the ID tags 13 are attached, the trap identification information Ia is read, and the trap attribute information Ib and trap reference information Id is entered. The test operator thereby enters the trap attribute information Ib and trap reference information Id for each of the managed traps T into the memory 8 of the testing unit 2 from the management database Db of the portable PC 3 for each of the managed traps T. The testing unit 2 is used to test each of the managed traps T, and the test results Ic are stored in the memory 8 of the testing unit 2 and are entered into the management database Db of the portable PC 3.

(d) As part of the initial operation, the current condition (e.g., malfunction rate, total vapor leakage, monetary loss due to vapor leakage, and the like) of all the managed traps T is reported to the management requester on the basis of the trap test results Ic for the entire number of the managed traps T recorded in the management database Db of the portable PC 3. An initial overhaul is then performed by consultation with the management requester. The overhaul is either a complete overhaul in which the entire number of the managed traps T is replaced with recommended traps (e.g., traps with reduced vapor leakage when operating normally, traps more suitable for the installation conditions or service conditions, or the like), or a partial overhaul in which only malfunctioning managed traps T are repaired or replaced with recommended traps.

In the initial overhaul, the replaced or repaired devices are retested using the testing unit 2 to determine whether the devices operate normally or have a malfunction. The repair or replacement is completed for those of the managed traps T that have been confirmed by the retesting to operate normally. For those of the managed traps T that have been confirmed by the retesting to have a malfunction, the repair or replacement is repeated until the retesting confirms that the devices operate normally.

Once a replaced or repaired managed trap T is confirmed by the retesting to operate normally, a replacement or repair record is made for this managed trap T; i.e., the fact of the replacement or repair is recorded in the management database Db of the portable PC 3, as are the post-replacement or post-repair trap attribute information Ib, trap test result Ic, and trap reference information Id.

(e) After the initial operation is completed, a complete test is performed periodically, such as annually or semiannually. The testing unit 2 is used to test the entire number of the managed traps T (i.e., to perform a test in which trap identification information Ia is read by the ID tag reader 4 for each trap T, and the probe 9 is brought against the trap T) irrespective of whether a complete or partial overhaul was performed as the initial overhaul. Each time the complete test is performed, trap attribute information Ic about each of the managed traps T is added to the management database Db. If a malfunctioning trap is detected, this trap is repaired or replaced with a recommended trap, and any trap that has operated for a preset service period (e.g., five years or another guaranteed period) from the most recent replacement, including a replacement during the initial overhaul, is replaced with a recommended trap.

In each cycle of complete testing, a replaced or repaired device is retested by the testing unit 2 to determine whether the device is operating normally or has a malfunction. This retesting is part of the complete test, similarly to an initial overhaul. A managed trap T that has been confirmed by the retesting to operate normally is not replaced or repaired, whereas a managed trap T that has been confirmed by the retesting to have a malfunction is repeatedly replaced or repaired until the retesting confirms that the device is operating normally. Once a replaced or repaired managed trap T is confirmed by the retesting to operate normally, a replacement or repair record is made for this managed trap T; i.e., the fact of the replacement or repair is added to the management database Db of the portable PC 3, as are the post-replacement or post-repair trap attribute information Ib, trap test result Ic, and trap reference information Id.

In each cycle of complete testing, another testing mode can be adopted instead of the testing mode in which the management unit 1 composed of a testing unit 2, portable PC 3, and ID tag reader 4 is used by the test operator as a portable unit to test each managed trap T in the same manner as during the previous cycle of initial overhauling accompanied by the creation of a management database Db. Specifically, it is also possible to adopt a testing mode in which only the testing unit 2 provided with an ID tag reader 4 is used by the test operator as a portable unit to test each managed trap T, and the trap test result Ic and trap reference information Id about each of the managed traps T recorded in the memory 8 of the testing unit 2 is collectively entered into the management database Db of the portable PC 3 after the test.

Traps that have been replaced as a result of a malfunction or the elapsing of a preset service period in each cycle of complete testing are recovered, repaired or adjusted to a reusable state, and reused.

(f) The service conditions, causes of malfunctions, and other information about the managed traps T are analyzed after each cycle of complete testing or in another suitable period using an analysis data creation function of the portable PC 3 such as the one described above (i.e., functions such as displaying the type of application based on the shape of a display element E, displaying the number N of malfunctions by the type of border on a display element E, displaying recorded information Ia to Id only for managed traps T of a specific classification category, or displaying a graph), suitability of the model of each managed trap T is determined or a suitable device model is selected, and, based on the results, the model of the managed traps T replaced in each cycle of complete testing is determined, installation conditions are improved for each of the managed traps T, or other measures are taken.

In this embodiment, the testing unit 2 constitutes input means for inputting a trap test result Ic of a complete test; the keyboard 14a, stylus 14b, or mouse of the portable PC 3 constitutes input means for inputting a classification category (general use, trace use, main pipeline use) to which each of the managed traps T belongs; the hard disk 17 of the portable PC 3 constitutes storage means for accumulating and storing the trap test result Ic of each cycle of complete testing that has been input by the testing unit 2 as the input means, and also storing the applicable classification category of each managed trap T that has been input in the same manner by the keyboard 14a, stylus 14b, or mouse as the input means; and the CPU 16 of the portable PC 3 constitutes arithmetic means for creating history information (malfunctioning frequency N) about each of the managed traps T, history information (malfunctioning frequency N) about each of the managed traps T classified by the classification categories, and analysis data (i.e., a facility chart image G in which display elements E are displayed, or an electronic data version thereof) that shows the relation between the history information (malfunctioning frequency N) and a plurality of the classification categories, with the information and data being created in accordance with management program Pb as a preset program on the basis of test results Ic of a complete test that spans a plurality of cycles, and on the basis of the applicable classification category of each of the managed traps T, as recorded on the hard disk 17 as the storage means. The input means, storage means, and arithmetic means constitute an analysis system for trap management.

Figure 8:
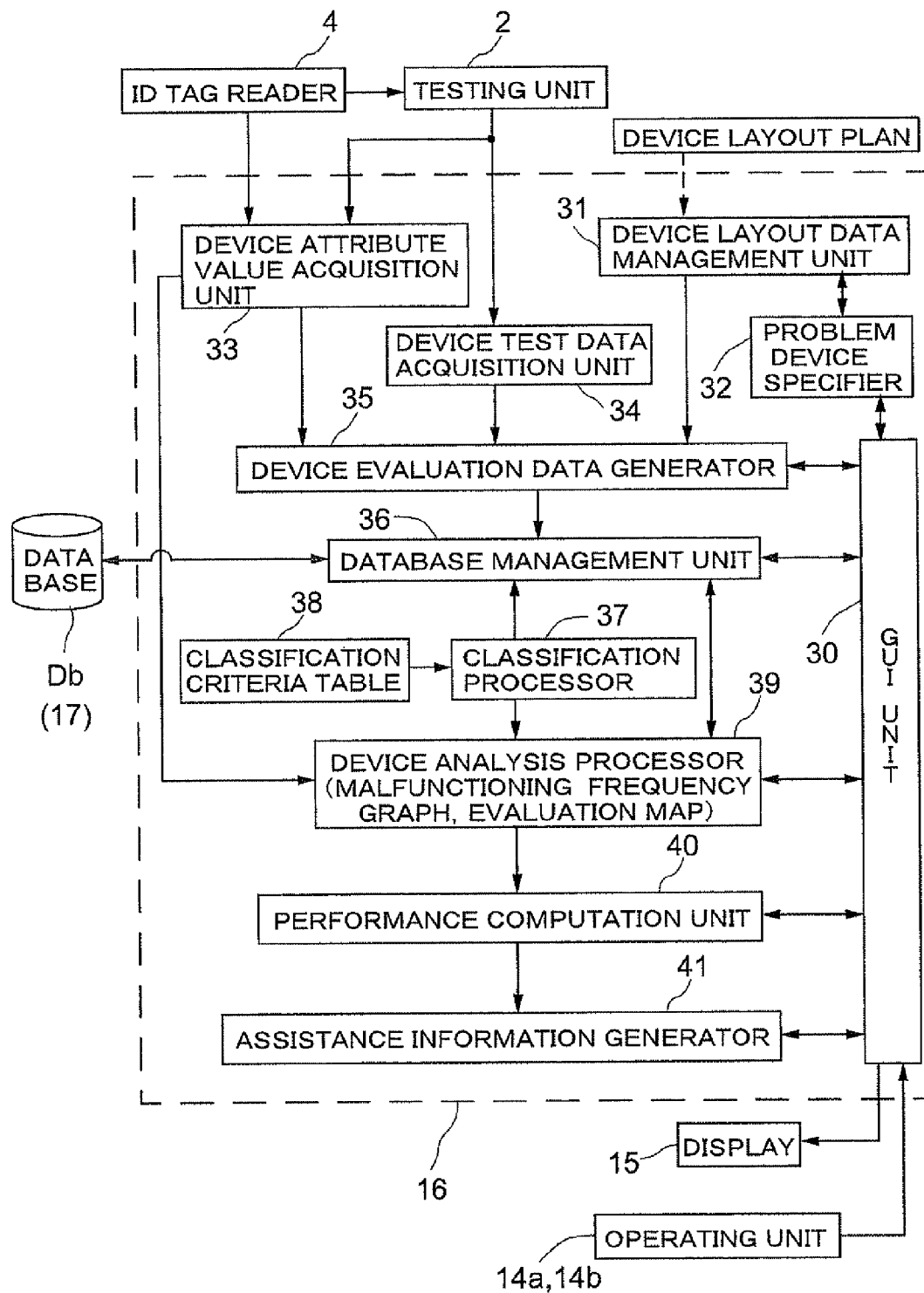
FIG. 8 is a functional block view of a portable PC.

In managing (performing maintenance inspections on) traps T and other plant facility devices (the term "trap T" has been used here in relation to such devices, but the word "device," which is a general term, will be adopted hereinbelow) at a plant facility, the above-described portable PC 3 uses a signal from the ID tag reader 4 or testing unit 2, and provides efficient assistance in managing (performing maintenance inspections on) plant facility devices. In particular, the portable computer 3 provides efficient assistance to the operator in determining the suitability of a device model or in selecting a suitable device model for each managed device. For this reason, the functions of the portable PC 3 are configured using programs and hardware such as those shown in FIG. 8.

Graphic user interfaces are extensively used in the portable PC 3 in order to transmit information to the operator in an easily understandable manner by presenting a graphic display via the display 15, and to allow comments to be entered by the simple operation of the operating units 14a, 14b via a graphic screen. The unit that implements such a graphic user interface is a GUI unit 30. This unit operates in close coordination with the OS installed on the portable PC 3, and is linked with a functional unit involved in the maintenance inspection operation assistance provided by the portable PC 3 and described below.

A device layout data management unit 31 performs a management task wherein device layout data is loaded from the outside. In the device layout data, device positions are linked to map data related to the plant site on the basis of device layout plan data digitized so as to indicate the layout of devices scheduled for maintenance inspections. When each device is subjected to a maintenance inspection, an assistance screen such as the one shown in FIG. 5 is displayed on the display 15 on the basis of the device layout data managed by the device layout data management unit 31, and the operator is notified of problem devices, which are devices that need to undergo a maintenance inspection next. Problem devices specified by the operator are confirmed by a problem device specifier 32. An identification symbol (trap identification information Ia) that is read by the ID tag reader 4 from an ID tag 13 attached to a problem device can be used as a key code for a device attribute value (trap attribute information Ib) stored in the memory 8 of the testing unit 2 in the above-described embodiment. Therefore, a device attribute value of the device specified by the identification symbol can be acquired by the portable PC 3. A device attribute value acquisition unit 33 is provided in order to acquire the device attribute value of the device specified via the ID tag 13 in this manner. The device specified by the ID tag 13, i.e., the problem device, is tested by the testing unit 2, whereby a test signal (trap test result Ic) sent from the testing unit 2 is processed by a device test data acquisition unit 34 as device test data that shows whether each device is operating normally or has a malfunction.

The device attribute values acquired by the device attribute value acquisition unit 33 and the test signals (device test data) acquired by the device test data acquisition unit 34 are sent to a device evaluation data generator 35, and are combined there in a mode in which the corresponding devices are linked to specific identification symbols to form device evaluation data. The device evaluation data thus generated for each of the problem devices is stored in a database Db. The device evaluation data for each device is stored in the database Db each time a periodic complete test is performed, and this device evaluation data is treated as history information about each of the devices. For this reason, a database management unit 36 is provided for recording the device evaluation data in the database Db after a history code (date or the like) is added so that the history of each device can be managed, and extracting device evaluation data that matches search conditions in which history conditions are also included. Since the devices recorded in the database Db are sorted into a large group of classification categories in accordance with the specifications of these devices, a classification that corresponds to these classification categories is needed when the device evaluation data is analyzed and on other occasions. A function is therefore provided wherein the device evaluation data is classified while a classification processor 37 accesses the database Db and references a classification criteria table 38 via the database management unit 36.

A device analysis processor 39 for analyzing the operational state of each device on the basis of the history of device evaluation data has an algorithm for performing a statistical analysis in terms of malfunctioning frequency as described above, and also has a visualizing algorithm for visually representing the analysis results in the form of a graph, map, or other format. Since the malfunctioning frequency is significantly affected by the location or the conditions of use, the device evaluation data serving as the analysis source is used in accordance with the analysis target either in the form of data directly extracted from the database Db or in the form of data classified by the classification processor 37. The device analysis processor 39 uses these algorithms to create analysis data that shows history information about each managed device in accordance with test results included in device evaluation data that spans a plurality of cycles. Specifically, the data thus created is analysis data that shows the malfunctioning frequency of each managed device, analysis data that shows the relation between the malfunctioning frequency of each of the managed devices and a plurality of classification categories, or analysis data that shows the malfunctioning frequency of each of the managed devices classified by the classification categories.

For the analysis results and the like obtained by the device analysis processor 39 to be used in performing maintenance inspections in a plant facility, a performance computation unit 40 is provided with a function whereby the malfunction rate, total vapor leakage, monetary loss due to vapor leakage, and the like of each device are calculated and the economic effects of the maintenance inspection operation are computed on the basis of the analysis results and of device evaluation data obtained from the database Db via the database management unit 36.

An assistance information generator 41 has an algorithm whereby support information related to the selection of a suitable device model at each installation site that accommodates a managed device is generated based on the analysis data. An example of the support information generated by this algorithm is information related to a device model that has a low malfunctioning frequency under the installation conditions and service conditions of that installation site. An algorithm for determining the suitability of a device model at each installation site that accommodates a managed device may also be provided instead of the aforementioned algorithm or together with the aforementioned algorithm. An example of support information in a case in which this algorithm is provided is determination information, as well as information related to a suitable device model, obtained when a determination is made as to whether a device model having a lower malfunctioning frequency can be found for an installation site, and it is determined that a more suitable device model can indeed be found. The support information thus generated is transmitted to the operator via the display 15. Using such support information makes it possible to make an appropriate selection of the device model or to modify an unsuitable device model in an efficient manner. As a result, losses brought about in the operation of a facility by malfunctions or the like can be efficiently reduced, and the lifecycle cost of the facility can be minimized in a comprehensive manner.

The following types of maintenance inspection guidelines have been offered for use in the maintenance inspection of plant facility devices: a complete overhaul strategy in which a complete overhaul is performed to replace the entire number of managed devices (devices to be subjected to maintenance inspections) with recommended devices, and a complete test involving the entire number of the managed devices is then periodically repeated; and a partial overhaul strategy in which a partial overhaul is performed to repair only those of the managed devices that have a malfunction, or to replace the malfunctioning devices with recommended devices, and a complete test involving the entire number of the managed devices is then periodically repeated. Selection of either the two strategies as appropriate varies with each plant facility. Therefore, the problem of which of the strategies to select in accordance with the plant facility scheduled for a maintenance inspection can be resolved by evaluating past performance. Therefore, the assistance information generator 41 is provided with an algorithm for generating support information (economic effects of each strategy at a variety of plant facilities, and the like) whereby either of the above-described two strategies is selected as a maintenance inspection guideline on the basis of economic effects evaluated by the performance computation unit 40. The algorithm for generating such support information can be constructed in a simple manner by adopting a decision theory system such as a neural network or an expert system.

Other Embodiments

Other embodiments of the present invention are described next.

Vapor traps are given as examples of managed devices in the above-described embodiment, but the managed devices used in the implementation of the present invention are not limited to vapor traps alone, and may also include various valves or tanks, as well as production equipment and machine tools.

The above embodiment was described with reference to an analysis system provided with arithmetic means in which analysis data that shows history information about each managed device, history information about each of the managed devices classified by the classification categories, and the relation between these types of history information and a plurality of the classification categories is created in accordance with a preset program on the basis of a test result of a complete test that spans a plurality of cycles and on the basis of the applicable classification category of each of the managed devices, as stored in the storage means. It is also possible, however, to instead adopt an analysis system that has input means for inputting a test result of a complete test, storage means for accumulating and storing the test result of each cycle of the complete test that has been input by the input means, and arithmetic means for creating, in accordance with a preset program, analysis data that shows history information about each of the managed devices on the basis of the test result of the complete test that spans a plurality of cycles, as stored in the storage means.

INDUSTRIAL APPLICABILITY

The present invention can be applied to the management or support of maintenance inspection operations involving a large group of devices typified by vapor traps, valves, and other devices installed in a plant.

The invention claimed is:

1. A device management method comprising:
periodically performing a complete test involving the entire number of managed devices installed in a plurality of installation sites to determine whether the devices are operating normally or have a malfunction;
recording a test result in a management database for each cycle of the complete test, and repairing or replacing a device that has been found to be malfunctioning; and
determining the suitability of a device model for each of the installation sites provided with the managed devices on the basis of history information for each installation site of interest relating to the devices, the history information being a single piece of history information for a single installation site which is an accumulation of pieces of history information before and after replacement of two or more devices that have been installed at the installation site of interest, the history information obtained from the test result of the complete test that spans a plurality of cycles, as recorded in the management database.

2. The device management method according to claim 1, comprising:
performing a complete overhaul as an initial operation to replace the entire number of managed devices with recommended devices, and creating the management database for cumulatively recording a test result of the complete test; and
periodically performing the complete test thereafter.

3. The device management method according to claim 1, comprising:
performing a partial overhaul as an initial operation to repair, or to replace with recommended devices, only some of the managed devices, including all the malfunctioning devices from among the managed devices, and creating the management database for cumulatively recording a test result of the complete test; and
periodically performing the complete test thereafter.

4. The device management method according to any of claims 1 to 3, comprising: recovering and then bringing to a reusable state and reusing a device that has been replaced as a result of a malfunction in each cycle of the complete test or as a result of a preset service period having elapsed.

5. An analysis system used in the device management method of claim 1, comprising:
input means for inputting a test result of the complete test;
storage means for cumulatively storing the test result for each cycle of the complete test that is input by the input means; and
arithmetic means for creating, in accordance with a preset program, analysis data that shows history information for each installation site of interest relating to the devices, the history information being a single piece of history information for a single installation site which is an accumulation of pieces of history information before and after replacement of two or more devices that have been installed at the installation site of interest before and after replacement on the basis of the test results stored cumulatively in said storage means as the result of a plurality of complete tests performed.

6. The analysis system according to claim 5, wherein the arithmetic means is configured to create the analysis data by using the malfunctioning frequency for each installation site of interest relating to the devices, the malfunctioning frequency being a single malfunctioning frequency for a single installation site which is an accumulation of malfunctioning frequencies of two or more devices that have been installed at the installation site of interest before and after replacement as the history information.

7. An analysis system used in the device management method of claim 1, comprising:
input means for inputting a test result of the complete test and a classification category to which each of the managed devices belongs;
storage means for cumulatively storing the test result for each cycle of the complete test that is input by the input means, and storing the applicable classification category of each of the managed devices that is input by the input means; and
arithmetic means for creating, in accordance with a preset program, analysis data that shows the relation between the history information for each installation site of interest relating to the devices, the history information being a single piece of history information for a single installation site which is an accumulation of pieces of history information before and after replacement of two or more devices that have been installed at the installation site of interest and a plurality of the classification categories, or analysis data that shows the history information for each installation site of interest relating to the devices, the history information being a single piece of history information for a single installation site which is an accumulation of pieces of history information before and after replacement of two or more devices that have been installed at the installation site of interest, the history information classified by the classification categories, on the basis of the test result of the complete test that spans a plurality of cycles and on the basis of the applicable classification category of each of the managed devices, as stored in the storage means.

8. The analysis system according to claim 7, wherein the arithmetic means is configured to create the analysis data by using the malfunctioning frequency for each installation site of interest relating to the devices, the malfunctioning frequency being a single malfunctioning frequency for a single installation site which is an accumulation of malfunctioning frequencies of two or more devices that have been installed at the installation site of interest before and after replacement which is an accumulation of malfunctioning frequencies of the devices that have been installed at the installation site of interest as the history information.

9. A maintenance inspection support method for a maintenance inspection operation comprising:
periodically performing a complete test involving all the devices in a group of managed devices installed at a predetermined installation site to determine whether the devices are operating normally or have a malfunction, and
repairing or replacing a device that has been found to be malfunctioning, the maintenance inspection support method comprising:
acquiring attribute information and a test result for each of the managed devices each time the complete test is performed;
combining the acquired test result and attribute information and storing the data in a management database;
creating analysis data on the basis of history information for each installation site of interest relating to the devices, the history information being a single piece of history information for a single installation site which is an accumulation of pieces of history information before and after replacement of two or more devices that have been installed at the installation site of interest, the history information obtained from the test result that spans a plurality of cycles and is stored in the management database; and
generating, based on the analysis data, support information related to determining the suitability of a device model or selecting a suitable device model for each of the installation sites provided with the managed devices.

10. A maintenance inspection support apparatus for a maintenance inspection operation comprising periodically performing a complete test involving all the devices installed in a plurality of installation sites to determine whether the devices are operating normally or have a malfunction, and repairing or replacing a device that has been found to be malfunctioning, the maintenance inspection support apparatus comprising:

a device attribute value acquisition unit for acquiring attribute information about each of the managed devices;

a device test data acquisition unit for acquiring a test result;

a device evaluation data generator for combining the acquired test result and the attribute information and generating device evaluation data;

a database management unit for appending a history code to the device evaluation data, storing the resulting data in a management database, and extracting device evaluation data that conforms to a search condition;

a device analysis processor for creating analysis data that shows history information for each installation site of interest relating to the devices, the history information being a single piece of history information for a single installation site which is an accumulation of pieces of history information before and after replacement of two or more devices that have been installed at the installation site of interest on the basis of the test result included in the device evaluation data that spans a plurality of cycles and is stored in the management database; and an assistance information generator for generating, based on the analysis data, support information related to determining the suitability of a device model or selecting a suitable device model for each of the installation sites provided with the managed devices.

11. The maintenance inspection support apparatus according to claim 10, further comprising:

a classification criteria table for storing a classification category to which each of the managed devices belongs; and a classification processor for classifying the device evaluation data by such classification categories with reference to the classification criteria table;

the device analysis processor replacing the analysis data that shows history information for each installation site of interest relating to the devices, the history information being a single piece of history information for a single installation site which is an accumulation of pieces of history information before and after replacement of two or more devices that have been installed at the installation site of interest and creating analysis data that shows the relation between the history information for each installation site of interest relating to the devices, the history information being a single piece of history information for a single installation site which is an accumulation of pieces of history information before and after replacement of two or more devices that have been installed at the installation site of interest and the classification categories of the managed devices classified by the classification processor, or analysis data that shows the history information for each installation site of interest relating to the devices, the history information being a single piece of history information for a single installation site which is an accumulation of pieces of history information before and after replacement of two or more devices that have been installed at the installation site of interest, the history information classified by the classification categories.

12. A device management method comprising:

periodically performing a complete test involving the entire number of managed devices installed in a plurality of installation sites to determine whether the devices are operating normally or have a malfunction;

recording a test result in a management database for each cycle of the complete test, and repairing or replacing a device that has been found to be malfunctioning; and selecting a suitable device model for each of the installation sites provided with the managed devices on the basis of history information for each installation site of interest relating to the devices, the history information being a single piece of history information for a single installation site which is an accumulation of pieces of history information before and after replacement of two or more devices that have been installed at the installation site of interest, the history information obtained from the test result of the complete test that spans a plurality of cycles, as recorded in the management database.

* * * * *

UNITED STATES PATENT AND TRADEMARK OFFICE
CERTIFICATE OF CORRECTION

PATENT NO. : 8,914,252 B2  
APPLICATION NO. : 11/996536  
DATED : December 16, 2014  
INVENTOR(S) : Yoshiyasu Fujiwara et al.

Page 1 of 1

It is certified that error appears in the above-identified patent and that said Letters Patent is hereby corrected as shown below:

In the Claims

Column 19, Lines 43-44, Claim 5, after "interest" delete "before and after replacement"

Signed and Sealed this  
Seventh Day of April, 2015

Michelle K. Lee  
*Director of the United States Patent and Trademark Office*